July 7, 1931.   L. C. WHITLOCK   1,813,650
DENTAL APPLIANCE
Filed July 16, 1929
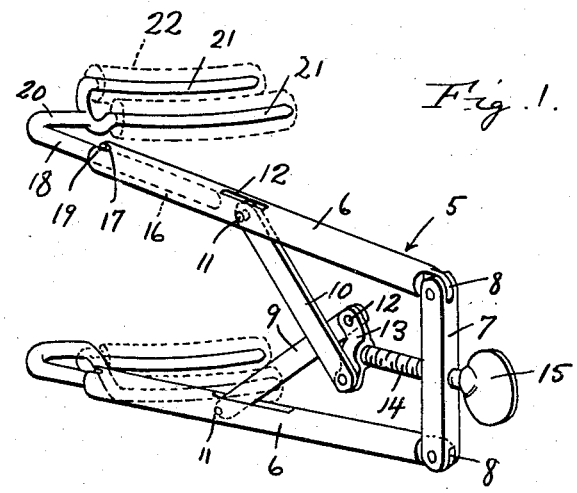
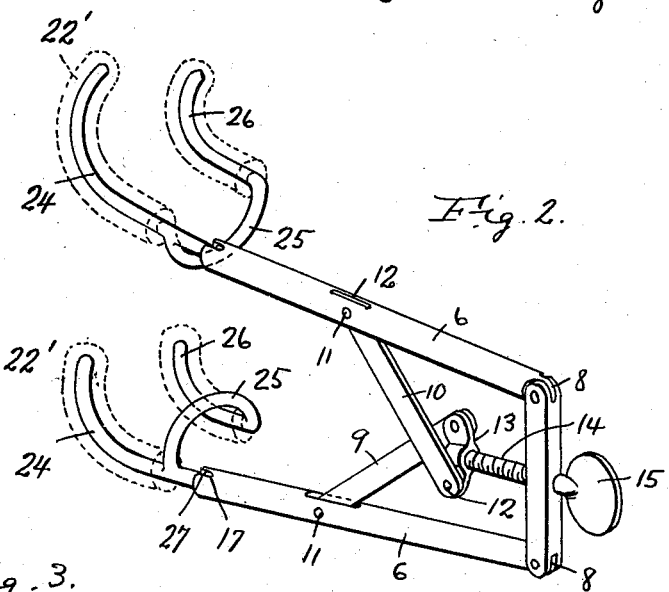
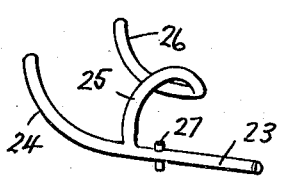
Inventor
*Luther C. Whitlock*
By *Clarence A. O'Brien*
Attorney Patented July 7, 1931

1,813,650

UNITED STATES PATENT OFFICE

LUTHER C. WHITLOCK, OF LAKE CITY, SOUTH CAROLINA

DENTAL APPLIANCE

Application filed July 16, 1929. Serial No. 378,795.

This invention relates broadly to dental appliances and has more particular reference to a dental appliance especially adapted to be inserted in the mouth of the patient to keep the tongue and cheek out of the way of the dentist.

A salient feature of the invention resides in the provision of an adjustable plate provided at one end thereof with a plurality of fingers, the fingers being arranged in pairs and having arranged thereon a roll of cotton, the device being adapted to be placed in the mouth to hold the mouth open and the tongue and cheek out of the way so as to keep the teeth of the patient dry.

Other objects and advantages of the invention will become apparent during a study of the following description, taken in connection with the accompanying drawings.

Figure 1 is a view of one form of my invention.

Figure 2 is a perspective view of another form of my invention.

Figure 3 is a perspective view of one pair of fingers.

With reference more in detail to the drawings and especially to Figure 1 wherein is shown one embodiment of my invention, it will be seen that I have designated generally by the reference character 5 a frame, comprising a pair of elongated side members 6—6, which members 6—6 are pivoted at one end to opposite ends of an end member 7, through the medium of pin joints 8—8. At their opposite ends, these side members 6—6 are free, the members being adapted to be moved toward and away from one another in a manner and for a purpose to be hereinafter more fully set forth. Cross bars 9 and 10 are pivoted at their forward ends as at 11 in longitudinally extending slots 12 formed in each of the members 6—6 intermediate the ends of said members. At their rear ends the cross members 9 and 10 are pivotally connected as at 12 to the corresponding ears of a wing nut 13. The wing nut 13 is rigidly fixed to the inner end of the threaded shank 14 of a screw 15, which screw 15 may be termed an actuating screw, the same being threaded through the member 7, intermediate the ends of the member. Obviously by rotating the screw 15 in the member 7, the cross members 9 and 10 will be actuated somewhat in the manner of a scissors for moving the members 6—6 of the same toward or away from one another as the wing nut 13 is moved toward or away from the end member 7. The members 6—6 are each further provided with an elongated pocket 16, extending longitudinally of the members, the opened end of the socket being at the free end of the said members. At the open end of the socket each of the members 6—6 are further provided with diametrically opposed slots or notches 17.

Shanks 18 are receivable in the sockets of the respective members 6—6 and the shanks are provided, intermediate their ends with diametrically opposed outwardly extending stop pins 19, receivable in the respective notches 17. Adjacent their outer ends the shanks 18 are bent to provide an angularly extending portion 20, which portion 20 in turn merges into angularly disposed co-extensive fingers 21, 21. The fingers 21 are of course spaced from one another and are curved as clearly shown. Rolls 22 are adapted to be secured by fingers 21 longitudinally of the respective members.

Another form of construction of the cotton holding members is clearly shown in detail in Figure 3, and the manner of applying these fingers are shown in Figure 3 to the frame 5 is illustrated in Figure 2. In this manner of forming the fingers, it will be seen that the shank 23 is curved at one end to provide a finger 24. Intermediate its ends or at the juncture with the fingers 24, the shank 23 is provided with an arcuate shaped laterally extending portion 25, which arcuate extension 25 merges at its free ends into an angularly disposed curved finger 26.

The curved fingers 24 and 26 are co-extensive and are arranged in spaced parallelism.

In practice, the shank portion 23 may be inserted in the socket 16 of the respective frame members 6—6, and the shank 23 is provided with laterally extending opposed stop pins 27 disposed rearwardly of the arcuate shaped extension 25 and the stop pins 27 are receivable in the notches 17 of the frame members 6—6. The fingers 24 and 26 are adapted to penetrate rollers 22' in identically the same manner as the fingers 21—21.

In practice, and in using either of the forms of the invention shown, the members 18—18 of the frame are inserted in the mouth so that the respective pairs of fingers are disposed one to each side of the teeth of the patient so that one finger will engage the cheek and the other finger will engage the tongue. After the device is placed in the mouth in the manner just mentioned, the actuating means 15 will be rotated so as to move the frame members 6—6 about their hinged connection to be moved to a position to spread the members the desired distance apart and in accord with the width of the mouth.

Thus it will be apparent that the device will maintain the mouth open and the fingers of the respective pairs engaging with the tongue and cheek as hereinbefore pointed out will keep the tongue and cheek of the patient out of the way and maintain the teeth in a dry state.

When the appliance is properly placed, the teeth can be easily dehydrated—as before crown, bridge or filling is inserted. It will also be appreciated that the fitting will be out of the operator's way so as not to interfere with the work being done to the teeth.

Another feature of this invention is in the fact that the fingers are detachable from the face and can be quickly and easily removed therefrom so that the fingers may be sterilized or the cotton rolls may be thrown away after having once been used.

Even though I have herein shown and described the preferred embodiment of my invention, it is to be understood that the same is susceptible to changes fully comprehended by the spirit of the invention as herein described and the scope of the appended claims.

What is claimed is:

1. A dental appliance comprising a pair of straight elongated frame bar members, the forward ends of said members terminating in sockets, a rear frame bar pivotally connected at its terminals to the rear ends of the frame bar members, shanks detachably received in said sockets, and absorbent roll holding forks carried by said shanks.

2. A dental appliance comprising a pair of elongated straight frame bar members, having their forward ends provided with sockets, a frame bar pivoted at its terminals to the rear ends of the frame bar members, shanks detachably received within the sockets, absorbent roll holding supports formed on said shanks, an adjusting screw threaded in the frame bar intermediate the frame bar member, a head swivelly carried by the forward end of said screw, and cross diagonally extending links pivotally connected to the opposite ends of said head and to the frame bar members intermediate the ends thereof.

In testimony whereof I affix my signature.

LUTHER C. WHITLOCK.